July 28, 1964  F. GAGEUR  3,142,108
TENTER CHAIN MECHANISM
Filed Nov. 5, 1962  3 Sheets-Sheet 1

Inventor:
FRITZ GAGEUR.
By K.A. /uayr
Attorney.

July 28, 1964 F. GAGEUR 3,142,108
TENTER CHAIN MECHANISM
Filed Nov. 5, 1962 3 Sheets-Sheet 2

Inventor:
FRITZ GAGEUR.
By K.H.Mayr
Attorney.

July 28, 1964 F. GAGEUR 3,142,108
TENTER CHAIN MECHANISM
Filed Nov. 5, 1962 3 Sheets-Sheet 3

Inventor:
Fritz Gageur.
By K.A.Mays
Attorney.

United States Patent Office 3,142,108
Patented July 28, 1964

3,142,108
TENTER CHAIN MECHANISM
Fritz Gageur, Lindau, Germany, assignor to Lindauer Dornier Gesellschaft m.b.H., Lindau, Germany, a firm of Germany
Filed Nov. 5, 1962, Ser. No. 235,212
Claims priority, application Germany Nov. 16, 1961
5 Claims. (Cl. 26—61)

The invention relates to a traveling clip chain for holding material which is stretched in a tenter.

The longitudinal sides of conventional tenters as they are used for stretching plastic foil or in the textile industry for stretching cloth are provided with means for holding the material to be tentered. These means are usually in the form of clips forming a chain and gripping the cloth or foil on each side. The clip chains move the cloth or foil through the tenter and, if desired, apply transverse tension to the cloth or foil. The clip chains usually slide in guide rails. The conventional tenter clips are unsymmetrical and are supported only below the clamping plate and are therefore not equally loaded. This causes several difficulties, if the tentering forces are great as in the case, particularly, in modern foil stretching machines. The strength of conventional clips is insufficient to cope with the requirements of these machines. At great tentering forces the friction in the sliding support of the clips becomes so great that the movement of the clip chains is seriously impaired.

It is the object of the present invention to provide a traveling tentering clip which avoids the difficulties experienced with conventional clips and which functions reliably also at very heavy loads. In order to reduce friction, roller bearings are provided in lieu of sliding supports. The main body of the clip forms a bracket of substantially even strength throughout. The bracket is bow-shaped and has a top portion whereon a pair of vertical pins is mounted and a bottom portion whereon also a pair of vertical pins is mounted. These pins serve as supports for rollers as well as pins for chain links. The great horizontal forces occurring during operation are almost equally distributed onto the two pairs of rollers which run in suitably shaped guide rails. The much weaker vertical forces are absorbed by sliding engagement of the clip body with the guide rails.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 1 also shows guide rails for the clip.

Like parts are designated by like numerals in the several figures.

Figure 1:
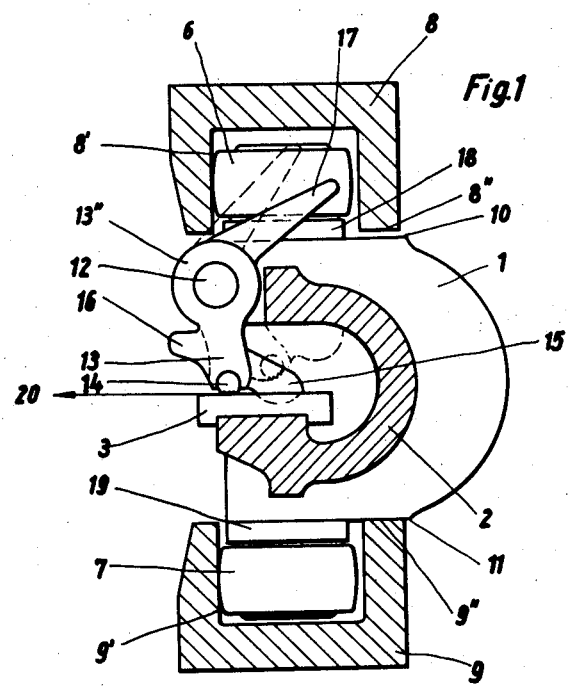
FIG. 1 is a vertical diagrammatic sectional view of a traveling tentering clip according to the invention, the section being made at a right angle to the travel direction of the clip and along line A—A of FIGS. 2 and 3.
Figure 2:
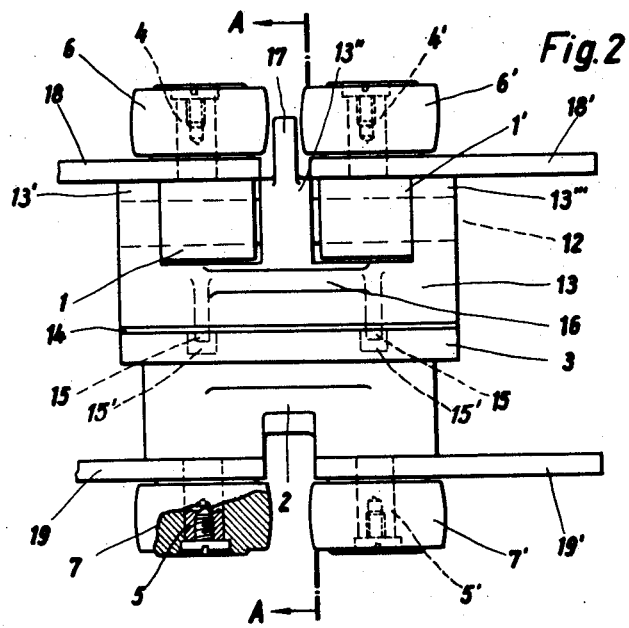
FIG. 2 is a part-sectional side view of the clip shown in FIG. 1.
Figure 3:
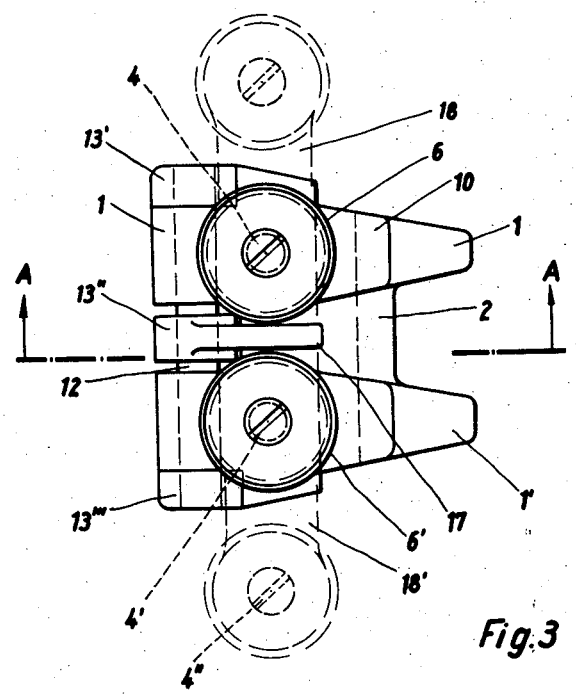
FIG. 3 is a top view of the clip shown in FIGS. 1 and 2.

Referring more particularly to FIGURES 1 to 3, two bow-shaped brackets 1 and 1' are interconnected by a web 2 to form the main body of the tenter clip according to the invention. The clip body is so shaped as to provide substantially equal strength of all portions of the body and the stress caused by the tentering operation is well distributed. Pins 4, 4' extend from the top of the brackets 1, 1', respectively, and pins 5, 5' extend from the bottom of the brackets 1, 1', respectively. The pins 4, 4' rotatably support rollers 6, 6', respectively, and the pins 5, 5' rotatably support rollers 7, 7', respectively. The top pins 4, 4' also swingably support chain links 18, 18', respectively, and the bottom pins swingably support chain links 19, 19', respectively.

For guiding the clip an upper rail 8 and a lower rail 9 are provided which are shown in section in FIG. 1. The material to be tentered which is clamped by the clips exerts a force on the clips which acts in the direction of the arrow 20 in FIG. 1. This causes pressing of the upper rollers 6 and 6' against the surface 8' of the upper guide rail 8 and of the rollers 7 and 7' against a surface 9' of the lower guide rail 9. Since the force 20 acts substantially in the middle of the clip the horizontal forces caused by the tentered material are substantially equally distributed onto the upper and lower rollers. The horizontal forces are also equally distributed between the rollers of each pair of rollers. Vertical forces which occur during normal operation are considerably weaker than the horizontal forces. It is therefore not necessary to provide roller support for absorbing the vertical forces. The clip slidably engages with the rails 8 and 9 in the rear of the location of the engagement of the clip with the material to be tentered and in the rear of the center of gravity of the clip. The brackets 1 and 1' of the clip body are provided with upper surfaces 10 and lower surfaces 11 which glide on horizontal surfaces 8" and 9", respectively, of the rails 8 and 9. The guide rails 8 and 9 serve for absorbing the horizontal as well as the vertical forces. Leaving the guide rails in the vertical direction is not possible with the arrangement according to the invention.

The brackets 1, 1' and the connecting web 2 of the clip support a flat, conventional clamping plate 3. The upper parts of the brackets 1 and 1' are provided with coaxial bores extending in the travel direction of the clip and receiving a pivot pin 12. This pin swingably supports a flap 13 at three locations, 13', 13" and 13"', shown in FIG. 2. The lower end of the flap 13 is provided with a clamping bar 14 having a plurality of longitudinal ridges for clamping the material to be tentered in the nip between the bar and the plate 3. Two conventional feeler arms 15 extend rearward from the lower part of the flap 13 and into recesses 15' in the clamping plate 3 when the clip is in clamping position. The flap 13 is also provided with a knock rib 16. When a clip of the clip chain reaches a predetermined position a conventional stationary guide element 16' knocks against the rib 16 and moves the flap 13 to the open position shown in dotted lines in FIG. 1. The flap 13 is provided with a conventional rocking lever 17 above the pin 12. As seen in FIGS. 2 and 3 the rocking lever 17 extends between the rollers 6 and 6' forming the upper roller pair.

The clips are interconnected by links 18, 18', 19, 19' to form a chain. The links 18, 18', 19, 19' have bores receiving the pins 4, 4', 5, 5', respectively. The spacing of these bores is equal to the spacing of the pins 4, 4' and 5, 5'.

Figure 4:
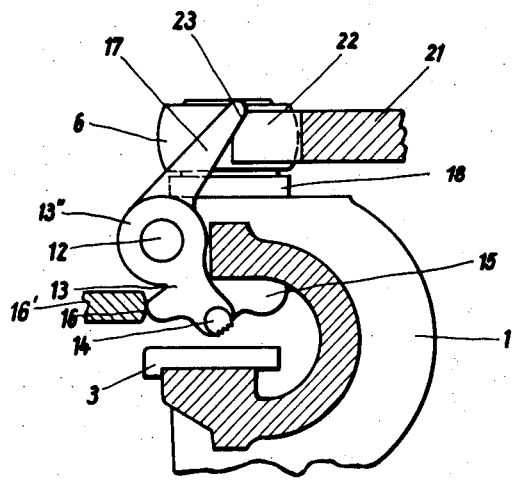
FIG. 4 is a sectional view of a portion of the clip shown in FIGS. 1 to 3 engaged by a guide wheel for changing the travel direction of the clip.
Figure 5:
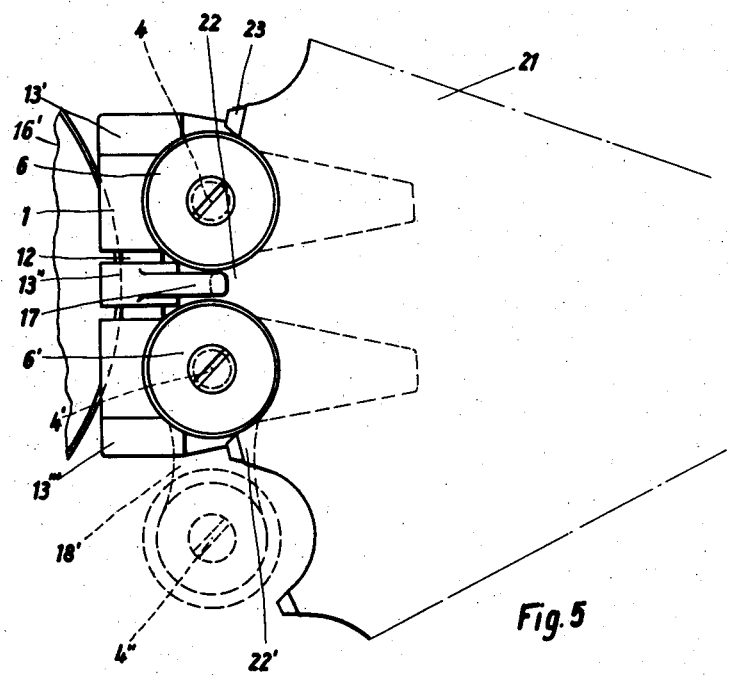
FIG. 5 is a top view of a tentering clip according to the invention in engagement with a guide wheel for changing the travel direction of the clip.

FIGS. 4 and 5 illustrate means for moving the clip chain and for opening the clips. Numeral 21 designates a portion of a deviating wheel provided with teeth 22, 22' whose pitch is equal to the distance between the rollers of the roller pairs forming part of the clips, which distance is equal to the spacing of the bores in the chain links 18, 18', 19, 19'. Upon leaving the rails 8, 9 and transfer of the clips to the deviating wheel 21 each clip is opened by a knock of the knock rib 16 against the stationary element 16' and the flap 13 is moved to the open position shown in FIG. 4. In this position the rocking lever 17 engages a tooth 22 of the wheel 21 whereby the flap 13 is held in open position as long as the lever 17 is engaged by a tooth 22, i.e., until the chain moves in the new direction and leaves the wheel 21. The teeth 22 of the wheel 21 are provided with beveled surfaces 23 against which the ends of the lever 17 abut. This arrangement avoids complicated mechanisms for maintaining the tentering clips in open position.

Not only is the function of the tentering clip according to the invention superior to that of conventional clips, but also the configuration of the clip is statically correct and absorbs the forces acting on the clip better than conventional clips. The clip according to the invention can be used for very great tentering forces. The movement of the clip chain does not involve any difficulties due to the provision of suitably located rollers and satisfactory distribution of the forces acting thereon. The combination of rollers for absorbing horizontal forces and of sliding support for absorbing vertical forces avoids edging and jamming of the clips even when very great forces act thereon. Since the sliding support of the clips is in the rear of the clamping location no abrasion can reach the material to be tentered, such as synthetic foil or film. The arrangement for maintaining the clips in open position when the travel direction is changed is also such that no harmful abrasion can occur which may be distributed on the material to be tentered, which is particularly undesirable if this material is a plastic film which is likely to be electrostatically charged.

I claim:

1. A traveling clip chain and chain guide arrangement for tenters, comprising:
  a plurality of clips,
  each clip having a bow-shaped body member having two vertically spaced horizontal portions,
  a horizontal plane surface forming a continuation of and at the outside of each of said horizontal portions, said plane surfaces having substantially equal configuration and being superposed,
  a pair of vertical upper pins projecting from the upper one of said horizontal portions,
  a pair of vertical lower pins projecting from the lower one of said horizontal portions,
  said pins being substantially in a common vertical plane placed in the travel direction of the clip,
  the distance between the longitudinal center lines of the upper pins being equal to the distance between the longitudinal center lines of the lower pins,
  said upper pins and said lower pins being pairwise coaxial,
  a roller rotatable on each of said pins,
  a plurality of upper chain links, each link being swingable on one of the upper pins of one clip and on one of the upper pins of a second clip,
  a plurality of lower chain links, each lower link being swingable on one of the lower pins of one clip and on one of the lower pins of a second clip,
  an upper rail having a vertical running surface engaged by the upper rollers of said clips,
  a lower rail having a vertical running surface engaged by the lower rollers of said clips,
  said vertical running surfaces being in a common vertical plane, and
  clamping means connected to said horizontal portions and having a clamping nip placed substantially in said last mentioned vertical plane,
  each of said rails having a horizontal surface, said horizontal surfaces of said rails being individually adjacent and slidably engageable with said plane surfaces at the outside of said horizontal portions of said body member.

2. A traveling clip chain and chain guide arrangement for tenters, comprising:
  a plurality of clips,
  each clip having a bow-shaped body member having two vertically spaced horizontal portions,
  a pair of vertical upper pins projecting from the upper one of said horizontal portions,
  a pair of vertical lower pins projecting from the lower one of said horizontal portions,
  said pins being substantially in a common vertical plane placed in the travel direction of the clip,
  the distance between the longitudinal center lines of the upper pins being equal to the distance between the longitudinal center lines of the lower pins,
  said upper pins and said lower pins being pairwise coaxial,
  a roller rotatable on each of said pins,
  a plurality of upper chain links, each link being swingable on one of the upper pins of one clip and on one of the upper pins of a second clip,
  a plurality of lower chain links, each lower link being swingable on one of the lower pins of one clip and on one of the lower pins of a second clip,
  an upper rail having a vertical running surface engaged by the upper rollers of said clips,
  a lower rail having a vertical running surface engaged by the lower rollers of said clips,
  said horizontal portions of said clips having coextensive vertically spaced, plane, horizontal surface portions,
  each of said rails having a plane horizontal running surface,
  said horizontal surface portions of said body members being individually slidably engageable with a horizontal running surface of one of said rails,
  a toothed wheel having gaps between the teeth, said gaps being so spaced and shaped as to receive said rollers for guiding said chain into the path defined by said rails,
  said clips including clamping means for clamping the material to be tentered, said clamping means being rockably connected to said body members and having arms individually extending between the rollers of the respective clips and engageable with the teeth of said toothed wheel for holding said clamping means in open position while the clip chain is guided by said wheel.

3. A traveling clip chain and chain guide arrangement for tenters, comprising:
  a plurality of clips,
  each clip having a bow-shaped body member having two vertically spaced horizontal portions,
  clamping means connected to said horizontal portions and placed therebetween,
  a pair of vertical upper pins projecting from the upper one of said horizontal portions,
  a pair of vertical lower pins projecting from the lower one of said horizontal portions,
  said pins being substantially in a common vertical plane placed in the travel direction of the clip,
  the distance between the longitudinal center lines of the upper pins being equal to the distance between the longitudinal center lines of the lower pins,
  said upper pins and said lower pins being pairwise coaxial,
  a roller rotatable on each of said pins,
  a plurality of upper chain links, each link being swingable on one of the upper pins of one clip and on one of the upper pins of a second clip,
  a plurality of lower chain links, each lower link being swingable on one of the lower pins of one clip and on one of the lower pins of a second clip,
  an upper rail having a vertical running surface engaged by the upper rollers of said clips, and
  a lower rail having a vertical running surface engaged by the lower rollers of said clips,
  each of said body members of said clips having plane, horizontal surface portions at the levels of the outsides of said vertically spaced horizontal portions of said body members, each of said rails having a plane horizontal running surface, said horizontal surface portions of said body members being located at the side of said body members which is averse from the side where the material to be tentered is located and being individually slidably engageable with a horizontal running surface of one of said rails.

4. A traveling clip chain and chain guide arrangement for tenters, comprising:

a plurality of clips, each clip having a bow-shaped body member having two vertically spaced horizontal portions, clamping means connected to said horizontal portions and placed therebetween, a pair of vertical upper pins projecting from the upper one of said horizontal portions, a pair of vertical lower pins projecting from the lower one of said horizontal portions, said pins being substantially in a common vertical plane placed in the travel direction of the clip, the distance between the longitudinal center lines of the upper pins being equal to the distance between the longitudinal center lines of the lower pins, said upper pins and said lower pins being pairwise coaxial, a roller rotatable on each of said pins, a plurality of upper chain links, each link being swingable on one of the upper pins of one clip and on one of the upper pins of a second clip, a plurality of lower chain links, each lower link being swingable on one of the lower pins of one clip and on one of the lower pins of a second clip, an upper rail having a vertical running surface engaged by the upper rollers of said clips, and a lower rail having a vertical running surface engaged by the lower rollers of said clips, each of said body members of said clips having plane, horizontal surface portions at the levels of the outsides of said vertically spaced horizontal portions of said body members, each of said rails having a plane horizontal running surface, said horizontal surface portions of said body members being located at the side of the center of gravity of said clips which side is averse from the side where the material to be tentered is located and being individually slidably engageable with a horizontal running surface of one of said rails.

5. A traveling clip chain and chain guide arrangement as defined in claim 1 wherein the nip of said clamping means is placed substantially in the middle between said horizontal surfaces.

References Cited in the file of this patent

UNITED STATES PATENTS

| | | |
|---|---|---|
| 139,038 | Bailey | May 20, 1873 |
| 469,221 | Babcock | Feb. 23, 1892 |
| 544,098 | Horton | Aug. 6, 1895 |
| 820,746 | Taylor | May 15, 1906 |
| 2,285,820 | MacKnight | June 9, 1942 |
| 3,046,599 | Nicholas et al. | July 31, 1962 |
| 3,050,816 | McCreary | Aug. 28, 1962 |

FOREIGN PATENTS

| | | |
|---|---|---|
| 335,166 | Germany | Mar. 29, 1921 |
| 112,553 | Great Britain | Jan. 17, 1918 |
| 743,333 | Great Britain | Jan. 11, 1956 |